UNITED STATES PATENT OFFICE.

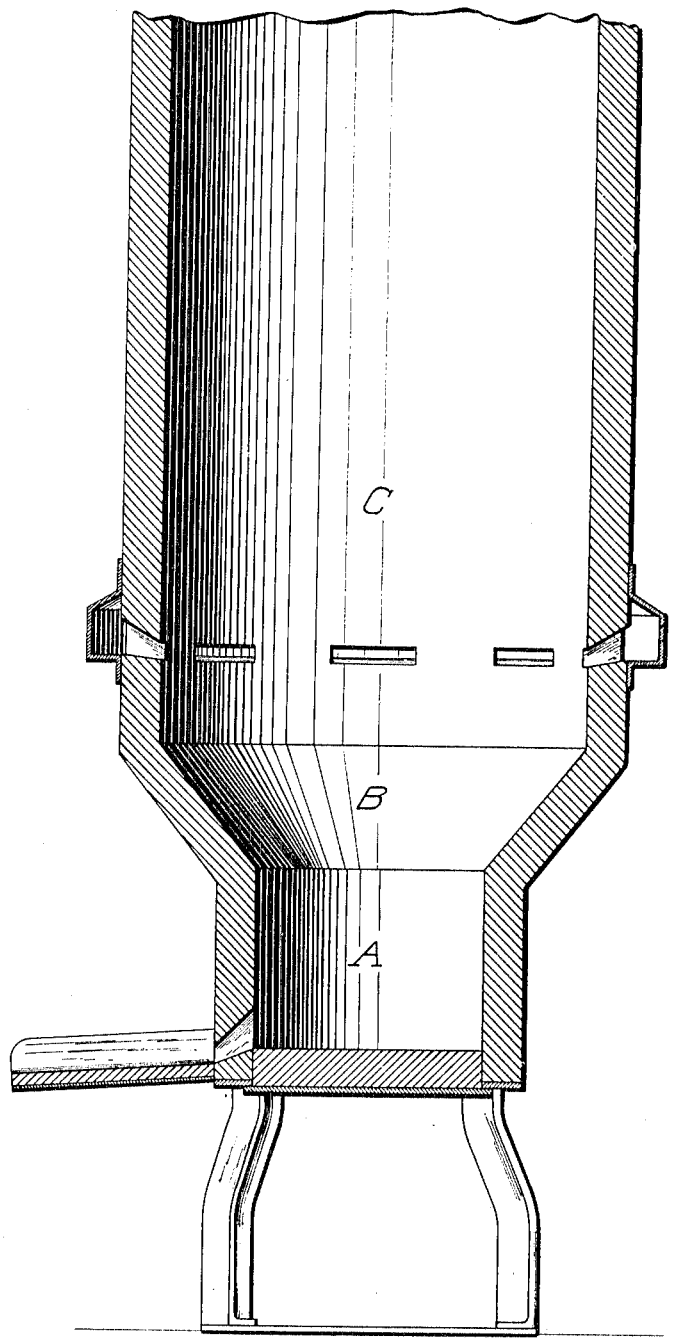

HENRY M. HOWE, OF BEDFORD STATION, NEW YORK, ASSIGNOR TO TAYLOR-WHARTON IRON AND STEEL COMPANY, OF HIGH BRIDGE, NEW JERSEY, A CORPORATION OF NEW JERSEY.

MANUFACTURE OF MANGANESE STEEL FROM SCRAP.

1,117,384.     Specification of Letters Patent.     Patented Nov. 17, 1914.

Application filed May 16, 1912. Serial No. 698,871.

*To all whom it may concern:*

Be it known that I, HENRY M. HOWE, a citizen of the United States, and a resident of Bedford Station, Westchester county, New York, have invented certain new and useful Improvements in Manufacture of Manganese Steel from Scrap, of which the following is a full, true, and concise specification.

This invention is a method of remanufacturing manganese steel scrap into manganese steel articles, and provides a simple method for this purpose whereby such scrap can be economically utilized to produce a manganese steel product, possessing the necessary critical relation between the proportions of its carbon, manganese and iron and otherwise similar to high grade manganese steel manufactured from raw materials. This is not possible by simple remelting of the scrap on account of the disturbance thereby caused in the original proportions of the carbon and manganese.

The method, briefly described, consists first in melting and mixing the scrap and a manganiferous material containing carbon in suitable proportions to produce the above mentioned critical ratio between the carbon and manganese in the mixture with a proper allowance for the changes in the proportions of these elements, that will take place from the reactions incident to the melting, that is to say, in such proportions as will compensate for the loss of manganese by oxidation and the gain of carbon by absorption from the fuel. Having established a desired ratio or an approximation thereto in the mixture, it is thereupon diluted with iron freed from carbon, until the respective amounts of carbon and manganese bear to the whole the desired percentage relation, such, for example, as exists in ordinary manganese steel. The foregoing steps are then supplemented by one or more additional operations or treatments adapted for adjusting the carbon or manganese with greater precision and resulting in manganese steel cheaply obtained and in every respect the equivalent of ordinary commercial manganese steel; all of which will appear from the detailed description of the preferred practice of the invention which I now proceed to give.

I melt the scrap with a material containing both manganese and carbon, but in which the manganese is relatively higher in proportion to its carbon, than it is in the scrap. Commercial ferromanganese containing 80% Mn. and about 5% C. is well suited to my purpose. The ratio of manganese and carbon in ordinary scrap is 12% Mn. to 1.2% carbon or thereabout. The necessary relative amounts of scrap and ferromanganese are predetermined, first, with respect to the exact percentages of carbon and manganese in each of them and the percentages desired for the finished product, and, second, with respect to the extent of the reactions that may be expected to obtain in the furnace employed. The latter should preferably be ascertained by trial. I conduct the melting in a shaft furnace of any suitable type, but I prefer to use a cupola, and to make it relatively narrow in its internal dimensions, by boshing it heavily, and with a relatively deep hearth, my object being to cause the boshes to hold the coke or fuel arched up over the hearth in about the level of the slag, and keep it from dipping down into the molten metal, so that the latter can drain down into the hearth out of contact with any form of carbon. It is desirable to keep the coke of the fuel charge in contact with the slag to the greatest extent possible so that it may act to reduce the manganese oxid therein and thereby return metallic manganese to the mixture, and it is likewise desirable to keep the molten metal out of contact to the greatest extent with carbon because the tendency of the melting process is to add carbon and thereby disturb the ratio which the ferromanganese has been added to establish. To this end the boshes are most conveniently made of a rammed-up mass of dolomite mixed with a little tar as a binder, and the deep hearth is lined with firebrick or any suitable material containing no carbon or other element likely to combine with the metal.

In the drawing a suitable furnace is shown in section, A being the hearth, B the boshes and C the main chamber.

Having ascertained the percentages of loss and gain respectively of the manganese and carbon that may be expected to take place in a given furnace or a cupola prepared as just explained, the proportions of scrap and ferromanganese are selected accordingly, and so as to leave a residuum of manganese and carbon, after melting, in which these two elements will approximate as closely as possible the ratio desired for the product steel and irrespective of the amount of iron and other elements therein, which, however, will be relatively small as compared with the proportions desired for the finished product. The manganese-carbon ratio of the ferromanganese being strongly in favor of the manganese, operates to counteract the effect of the melting, which tends to cause the mixture to depart from the desired ratio in favor of the carbon, and thus it is possible, by the appropriate selection of proportions, and with suitable allowance for changes, to establish with fair accuracy any desired ratio of these elements in the metal that reaches the hearth. The tendency is for the carbon content of the mixture to increase by absorption, notwithstanding the construction of the cupola, and for this reason the molten metal should be tapped from the bottom of the hearth frequently to keep it from rising into contact with the coke or with the tar of the dolomite boshes. If the mixture should be found to be too high in carbon and too low in manganese with the excess of carbon less in proportion than the deficit of manganese, more ferromanganese or some manganese ore may be added to the charge before the melting, or if the excess of carbon should be greater in proportion than the deficit of manganese, then iron ore could be added and also manganese ore. On the other hand, if the manganese should run too high in proportion to the carbon, the carbon can be increased without increasing the manganese, by the addition of ordinary carbon steel scrap to the charge. In the next step of the process, the molten metal taken from the cupola is diluted with blown metal of the Bessemer process, a sufficient quantity being used to bring the respective amounts of manganese and carbon (already adjusted to the desired relative proportions or nearly so) to a predetermined or proper percentage with respect to the whole diluted mixture; as, for example, 12% for the manganese and 1.2% for the carbon. Such dilution may be made in a ladle and the resulting metal then poured therefrom into the molds, or it may be made in a mixer, if desired; but in either case the amounts of blown Bessemer metal and metal from the cupola are carefully weighed and preferably while molten.

As an example of suitable proportions, the manufacture of manganese steel of common composition, say 12% manganese and about 1.2% carbon, is accomplished by melting in a shaft furnace one part of ferromanganese containing about 80% manganese, one part of manganese steel scrap, and the product of these after treatment as above described is diluted with four parts of blown metal. If I should wish to make an 8% managanese steel, I melt in the shaft furnace one part of ferromanganese with two parts of manganese steel scrap, diluting the product with six parts of the blown metal. The inability to predetermine with definite accuracy the extent of the several reactions that may take place in the shaft furnace, may be expected to result in some variation from the desired percentage relations, and the tendency will be for the carbon to be in excess. The next following step in the process is a corrective treatment designed to reduce the percentage of carbon, when it is in excess, without simultaneously reducing the manganese, and consists in treating the mixture of the cupola and Bessemer metals in an open-hearth furnace with a manganese silicate slag as free from iron oxid and such as may be had, for instance, by using manganese ore as the slagging agency. I have found that by the use of such slag the oxygen of the manganese oxid therein can be made to combine with the carbon of the metallic mixture rather than with the manganese thereof, while the reduction of manganese of the slag, thus obtaining, serves to add metallic manganese to the mixture, thereby effecting the desired adjustment of percentages in a most expeditious manner since the manganese is increased coincidentally with the decrease of the carbon. In connection with the use of such slag as above described, it may be explained that the manganese oxid therein is a base and is held as a base by the silica. The union of these elements opposes the de-oxidization of the manganese so that the latter can be released only by having present a sufficient quantity of the base to satisfy and neutralize the silica. In that event the hold of the slag upon the manganese oxid is so feeble that the carbon of the molten bath is able to de-oxidize the manganese oxid and thereby bring this manganese out of the slag into the metal. The layer of manganese oxid slag should be as thick as consistent with the proper heating of the charge, so as to obstruct any transfer of oxygen from the flame to the metal through the slag as a vehicle. I have found, further, that the selective oxidation of the carbon in preference to the manganese can be promoted by the use of an ultra-reducing flame, preferably in conjunction with the manganese silicate slag. Such a flame can be obtained by restricting the amount of fuel air to an extent sufficient to eliminate the presence of any free oxygen in the atmosphere within the furnace or immediately above the charge. With such a flame there may be considerable iron oxid in the slag layer without effecting serious oxidation of the manganese. In either case the use of an acid open hearth furnace is preferred.

Having concluded the adjustment of proportions in the foregoing manner, the metal may then be poured and otherwise treated according to the usual or any preferred practice suited for the production of manganese steel articles. It will be understood, however, that the final adjustment of proportions in the open-hearth furnace may include the addition to the charge of any material suited for directly increasing the manganese, or that a simple treatment of the cupola metal in an open-hearth furnace, without the precautions against oxidation of manganese above enumerated, may be resorted to when the manganese is higher in proportion than desired.

I claim:

1. A method of manufacturing manganese steel scrap into manganese steel, which comprises the steps of melting such scrap and ferromanganese in suitable proportions to establish in the mixture a predetermined relation between the amounts therein of carbon and manganese and thereafter diluting such mixture with iron for the purpose and with the result of producing a product mixture having a predetermined mutual relation of each of said elements and a predetermined joint relation of both of the same to the whole.

2. A method of manufacturing manganese steel scrap into manganese steel, which comprises melting the scrap in a shaft furnace, adjusting the relative proportions of manganese in the molten metal by adding thereto a suitable quantity of ferromanganese and adding blown metal of the Bessemer process to the mixture.

3. A method of manufacturing manganese steel scrap into manganese steel, which comprises melting manganese steel scrap, adjusting the relative proportions of carbon and manganese in the molten metal by melting therewith a suitable quantity of ferromanganese, diluting such mixture with iron and further adjusting such relative proportions of carbon and manganese by reducing the carbon in an open-hearth furnace.

4. A method of manufacturing manganese steel scrap into manganese steel, which consists in melting a mixture of manganese steel scrap and ferromanganese, diluting the mixture with molten iron and treating the product in an open-hearth furnace with manganese oxid.

5. A method of manufacturing manganese steel scrap into manganese steel, which comprises melting the steel scrap with suitable additions to form a molten mixture and diminishing the percentage ratio of carbon to manganese in such mixture by covering the same with a slag containing manganese oxid in excess of iron oxid, and then diluting the mixture with iron.

6. A method of manufacturing manganese steel scrap into manganese steel, which comprises forming a molten mixture of such scrap and a material containing carbon and diminishing the percentage ratio of the carbon to the manganese in such mixture by heating the same in an open-hearth furnace with a manganese silicate slag and in a non-oxidizing atmosphere.

7. A method of manufacturing manganese steel scrap into manganese steel, which consists in melting the scrap and ferromanganese in relative proportions suited to establish a predetermined relation between the amounts of manganese and carbon in the resulting metal of the mixture, diluting said metal with blown metal of the Bessemer process and adjusting the proportions of said diluted mixture by treatment in an open-hearth furnace with a manganese silicate slag substantially free from iron oxid.

In testimony whereof, I have signed this specification in the presence of two witnesses.

HENRY M. HOWE.

Witnesses:
 HELEN M. TOWEY,
 EDITH M. MACKECHNIE.